United States Patent
Matsumura et al.

(10) Patent No.: US 12,349,077 B2
(45) Date of Patent: Jul. 1, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 399 days.

(21) Appl. No.: 18/040,351

(22) PCT Filed: Aug. 5, 2020

(86) PCT No.: PCT/JP2020/029942
§ 371 (c)(1),
(2) Date: Feb. 2, 2023

(87) PCT Pub. No.: WO2022/029912
PCT Pub. Date: Feb. 10, 2022

(65) Prior Publication Data
US 2023/0276371 A1 Aug. 31, 2023

(51) Int. Cl.
*H04W 52/14* (2009.01)
(52) U.S. Cl.
CPC .................. *H04W 52/146* (2013.01)
(58) Field of Classification Search
CPC .............................................. H04W 52/00–60
See application file for complete search history.

(56) References Cited

U.S. PATENT DOCUMENTS

| | | | |
|---|---|---|---|
| 2014/0071903 A1* | 3/2014 | Sorrentino | H04W 52/54 370/329 |
| 2015/0201382 A1* | 7/2015 | Wang | H04W 52/14 370/311 |
| 2016/0227486 A1* | 8/2016 | Park | H04W 72/21 |
| 2018/0192404 A1* | 7/2018 | Maaref | H04L 5/0044 |
| 2019/0297579 A1* | 9/2019 | Bhattad | H04W 72/232 |
| 2020/0092820 A1 | 3/2020 | Chen et al. | |

(Continued)

FOREIGN PATENT DOCUMENTS

CN 111132295 A 5/2020

OTHER PUBLICATIONS

Office Action issued in counterpart Chinese Application No. 202080105676.0, mailed Apr. 12, 2024 (25 pages).

(Continued)

*Primary Examiner* — Raymond S Dean
(74) *Attorney, Agent, or Firm* — Osha Bergman Watanabe & Burton LLP

(57) ABSTRACT

A terminal according to an aspect of the present disclosure includes a receiving section that receives single downlink control information (DCI) for a plurality of uplink shared channels (Physical Uplink Shared Channels (PUSCHs)), and a control section that controls transmission of the plurality of PUSCHs, based on an extended transmit power control (TPC) command field included in the DCI and spatial relation information (SRI) corresponding to an index associated with the TPC. According to an aspect of the present disclosure, even when multi-TRP is applied, PUSCH repetitive transmission can be appropriately controlled.

7 Claims, 12 Drawing Sheets

(56) References Cited

U.S. PATENT DOCUMENTS

2020/0383061 A1* 12/2020 Yang ................... H04W 52/50
2021/0368450 A1* 11/2021 Maggi ................ H04W 52/225

OTHER PUBLICATIONS

International Search Report issued in PCT/JP2020/029942 on Feb. 22, 2021 (2 pages).
Written Opinion of the International Searching Authority issued in PCT/JP2020/029942 on Feb. 22, 2021 (4 pages).
Huawei, HiSilicon; "Enhancements on Multi-TRP/panel transmission"; 3GPP TSG RAN WG1 #97, R1-1906029; Reno, USA; May 13-17, 2019 (17 pages).
CATT; "Discussion on multi-panel/multi-TRP transmission"; 3GPP TSG RAN WG1 Meeting #88bis, R1-1704549; Spokane, USA; Apr. 3-7, 2017 (5 pages).
Lenovo, Motorola Mobility; "Remaining issues on multi-TRP/panel transmission"; 3GPP TSG RAN WG1 Meeting #100bis, R1-2001971; e-Meeting, Apr. 20-30, 2020 (11 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

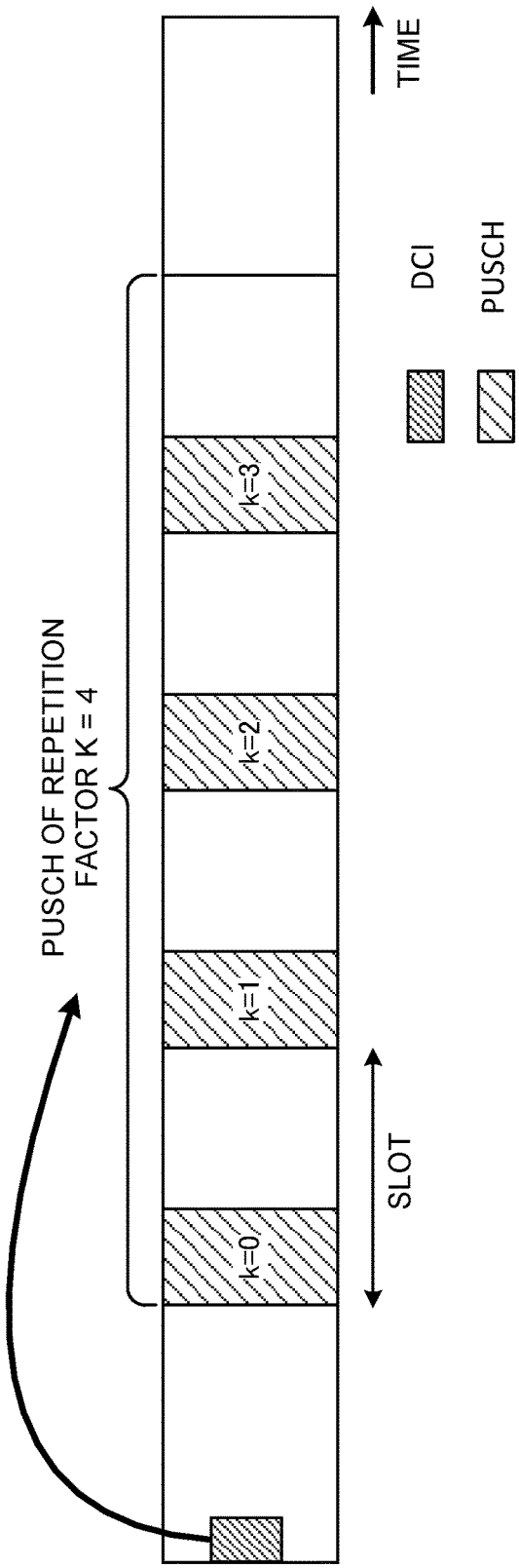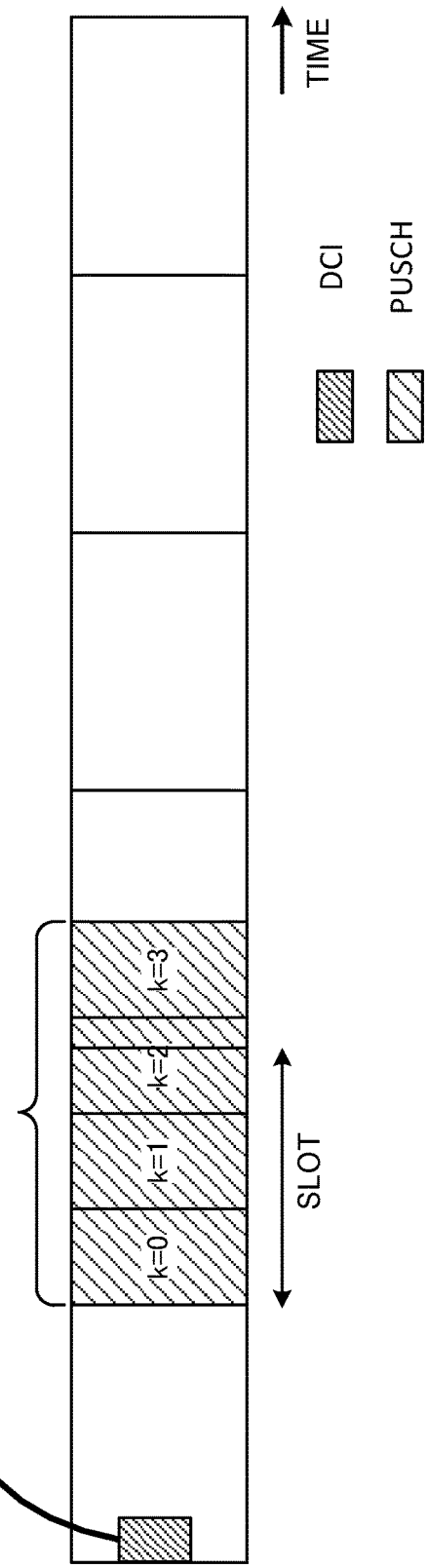

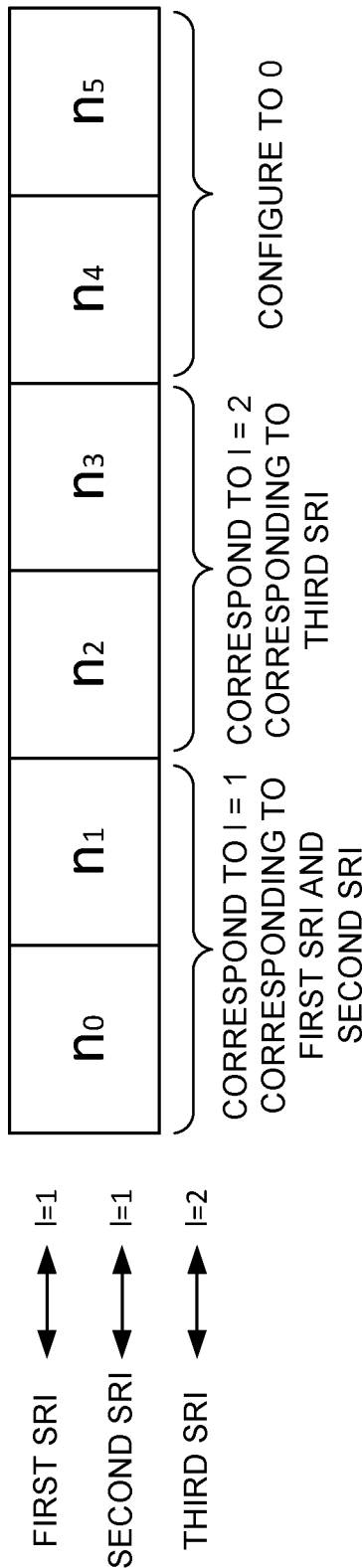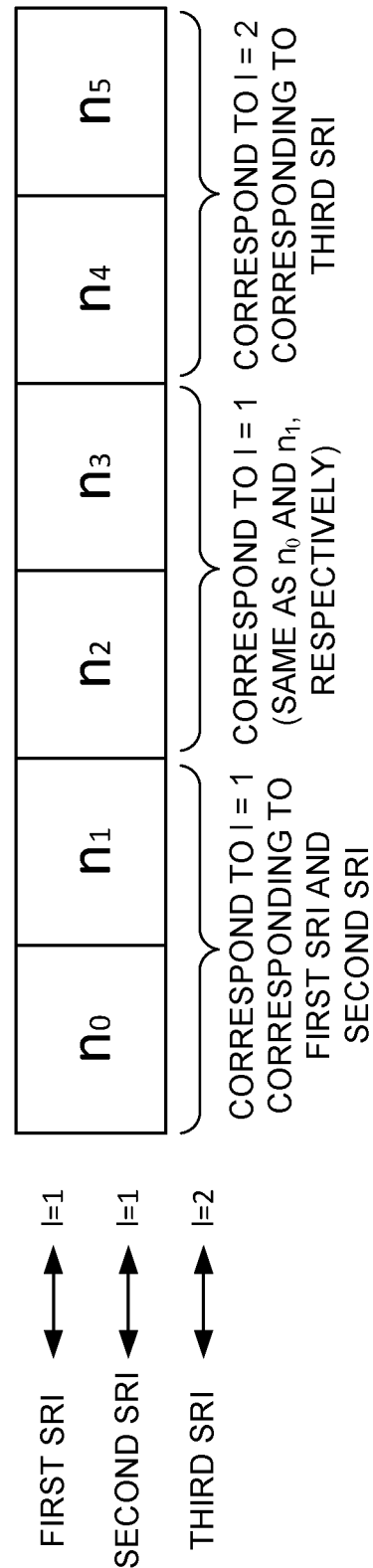

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP)) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In 3GPP Rel. 15, repetitive transmission in a UL data channel (for example, an uplink shared channel (Physical Uplink Shared Channel (PUSCH))) is supported. A UE controls to perform transmission of PUSCHs over a plurality of slots (for example, K consecutive slots), based on a repetition factor K configured by a network (for example, a base station). In other words, when repetitive transmission is performed, the PUSCHs are each transmitted in different slots (for example, a unit of a slot).

Meanwhile, in Rel. 16 or later versions, when PUSCH repetitive transmission is performed, performing a plurality of PUSCH transmissions within one slot has been under study. In other words, transmission of each PUSCH is performed in a unit shorter than a slot (for example, a unit of a sub-slot, a unit of a mini-slot).

For NR, communication using one or a plurality of transmission/reception points (TRPs) (multi-TRP) has been under study.

However, in NR specifications thus far, a full study has not been conducted on how to control PUSCH repetitive transmission in multi-panel/TRP. Unless PUSCH repetitive transmission in the multi-TRP is appropriately performed, throughput may be reduced or communication quality may be deteriorated.

In view of this, the present disclosure has one object to provide a terminal, a radio communication method, and a base station that can appropriately control the PUSCH repetitive transmission.

Solution to Problem

A terminal according to an aspect of the present disclosure includes a receiving section that receives single downlink control information (DCI) for a plurality of uplink shared channels (Physical Uplink Shared Channels (PUSCHs)), and a control section that controls transmission of the PUSCHs based on an extended transmit power control (TPC) command field included in the DCI and spatial relation information (SRI) corresponding to an index associated with the TPC.

Advantageous Effects of Invention

According to an aspect of the present disclosure, even when multi-TRP is applied, PUSCH repetitive transmission can be appropriately controlled.

BRIEF DESCRIPTION OF DRAWINGS

FIG. 1A and FIG. 1B are diagrams to show examples of repetitive transmission of PUSCHs;

FIG. 7A and FIG. 7B are diagrams to show other examples of association between the extended TPC command field and the closed loop indexes;

DESCRIPTION OF EMBODIMENTS (Repetitive Transmission)

Figures 2A, 2B:
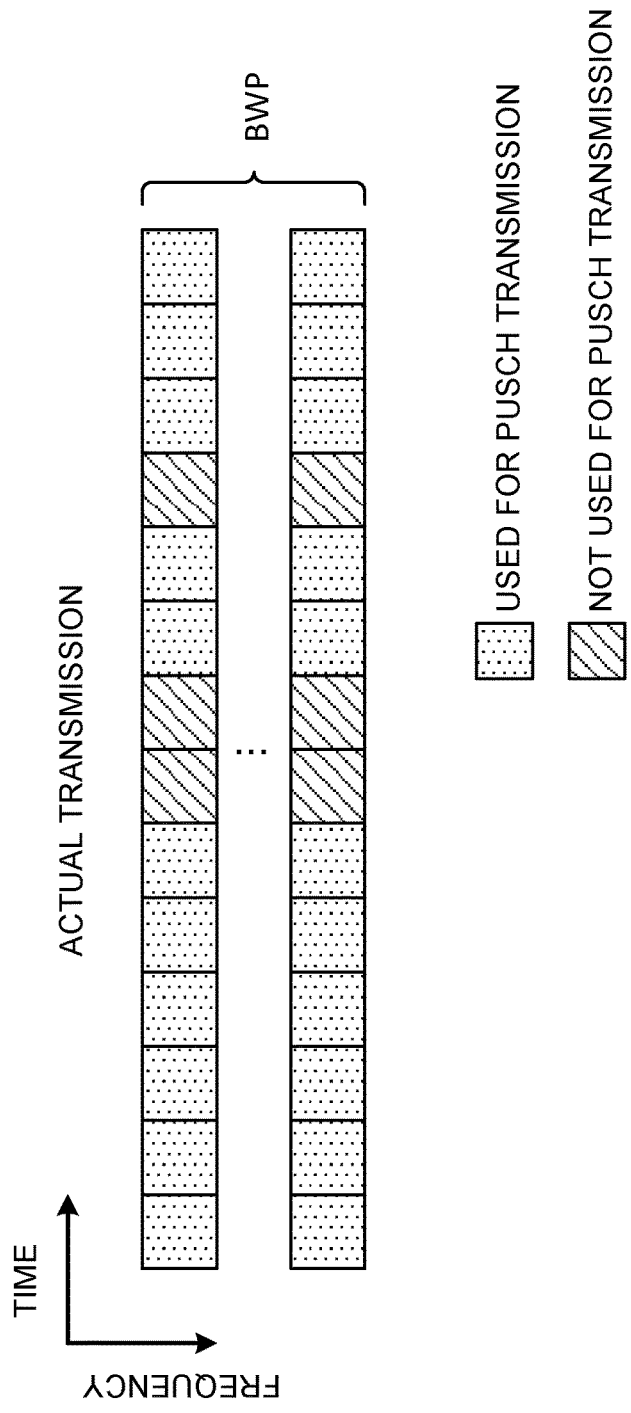
FIG. 2A and FIG. 2B are diagrams to show examples of an invalid symbol pattern.

In Rel. 15, repetitive transmission in data transmission is supported. For example, a base station (a network (NW), a gNB) repeats transmission of DL data (for example, a downlink shared channel (PDSCH)) a given number of times. Alternatively, a UE repeats UL data (for example, an uplink shared channel (PUSCH)) a given number of times.

FIG. 1A is a diagram to show an example of repetitive transmission of PUSCHs. FIG. 1A shows an example in which a given number of repetitions of the PUSCHs is scheduled by single DCI. The number of repetitions is also referred to as a repetition factor K or an aggregation factor K.

In FIG. 1A, repetition factor K=4, however a value of K is not limited thereto. An n-th repetition is also referred to as an n-th transmission occasion or the like, and may be identified by a repetition index k (0≤k≤K−1). FIG. 1A shows repetitive transmission of PUSCHs dynamically scheduled by DCI (for example, dynamic grant-based PUSCHs), but the present disclosure may be applied to repetitive transmission of configured grant-based PUSCHs.

For example, in FIG. 1A, the UE semi-statically receives information (for example, aggregationFactorUL or aggregationFactorDL) indicating the repetition factor K, using higher layer signaling. Here, the higher layer signaling may be, for example, any one of or a combination of RRC (Radio Resource Control) signaling, MAC (Medium Access Control) signaling, broadcast information, and the like.

For example, the MAC signaling may use a MAC control element (MAC CE), a MAC PDU (Protocol Data Unit), and the like. For example, the broadcast information may be a master information block (MIB), a system information block (SIB), minimum system information (RMSI (Remaining Minimum System Information)), and the like.

The UE controls PDSCH reception processing (for example, at least one of reception, demapping, demodulation, and decoding) or PUSCH transmission processing (for example, at least one of transmission, mapping, modulation, and coding) in K consecutive slots, based on at least one of the following field values (or information indicated by the field values) in the DCI:

allocation of time domain resources (for example, a start symbol, the number of symbols in each slot, and the like), allocation of frequency domain resources (for example, a given number of resource blocks (RBs), a given number of resource block groups (RBGs)), modulation and coding scheme (MCS) index, configuration of a PUSCH demodulation reference signal (DMRS), spatial relation information (spatial relation info) of the PUSCH, or a state of transmission configuration indication (or Transmission Configuration Indicator (TCI)) (TCI state (TCI-state)).

Among the K consecutive slots, the same symbol allocation may be applied. FIG. 1A shows a case in which the PUSCH in each slot is allocated to a given number of symbols from the start of the slot. The same symbol allocation among the slots may be determined as described in the time domain resource allocation.

For example, the UE may determine symbol allocation in each slot, based on the start symbol S and the number L of symbols (for example, a Start and Length Indicator (SLIV)) determined based on a value m of a given field (for example, a TDRA field) in the DCI. Note that the UE may determine a first slot, based on K2 information determined based on the value m of the given field (for example, the TDRA field) in the DCI.

On the other hand, among the K consecutive slots, a redundancy version (RV) applied to a TB based on the same data may be the same, or may be at least partially different. For example, the RV applied to the TB in the n-th slot (transmission occasion, repetition) may be determined based on a value of a given field (for example, an RV field) in the DCI.

When the resources allocated in the K consecutive slots have, in at least one symbol, a communication direction different from UL, DL, or flexible in each slot indicated by at least one of uplink/downlink communication direction indication information for TDD control (for example, RRC IEs "TDD-UL-DL-ConfigCommon" and "TDD-UL-DL-ConfigDedicated") and a slot format indicator of DCI (for example, DCI format 2_0), the resources of the slot including the symbol may not be transmitted (or received).

In Rel. 15, as shown in FIG. 1A, repetitive transmission of PUSCHs is performed over a plurality of slots (unit of a slot), whereas in Rel. 16 or later versions, it is assumed that repetitive transmission of PUSCHs is performed in a unit shorter than a slot (for example, a unit of a sub-slot, a unit of a mini-slot, or a unit of a certain number of symbols) (see FIG. 1B).

In FIG. 1B, repetition factor K=4, however a value of K is not limited thereto. An n-th repetition is also referred to as an n-th transmission occasion or the like, and may be identified by a repetition index k (0≤k≤K−1). FIG. 1B shows repetitive transmission of PUSCHs dynamically scheduled by DCI (for example, dynamic grant-based PUSCHs), but the present disclosure may be applied to repetitive transmission of configured grant-based PUSCHs.

The UE may determine symbol allocation of PUSCH transmission (for example, PUSCH of k=0) in a given slot, based on the start symbol S and the number L of symbols (for example, Start Symbol and length) determined based on a value m of a given field (for example, a TDRA field) in the DCI of the PUSCH. Note that the UE may determine a given slot, based on Ks information determined based on the value m of the given field (for example, the TDRA field) in the DCI.

The UE may dynamically receive information (for example, numberofrepetitions) indicating the repetition factor K, using downlink control information. The repetition factor may be determined, based on the value m of the given field (for example, the TDRA field) in the DCI. For example, a table defining correspondence between a bit value notified with the DCI and the repetition factor K, the start symbol S and the number L of symbols may be supported.

Slot-based repetitive transmission shown in FIG. 1A may be referred to as repetitive transmission type A (for example, PUSCH repetition Type A), and sub-slot-based repetitive transmission shown in FIG. 1B may be referred to as repetitive transmission type B (for example, PUSCH repetition Type B).

The UE may be configured to apply at least one of repetitive transmission type A and repetitive transmission type B. For example, the repetitive transmission type applied by the UE may be notified from the base station to the UE, using higher layer signaling (for example, PUSCHRepTypeIndicator).

Either one of repetitive transmission type A or repetitive transmission type B may be configured for the UE for each DCI format for scheduling the PUSCH.

For example, when higher layer signaling (for example, PUSCHRepTypeIndicator-AorDCIFormat0_1) is configured to repetitive transmission type B (for example, PUSCH-RepTypeB) regarding a first DCI format (for example, DCI format 0_1), the UE applies repetitive transmission type B to PUSCH repetitive transmission scheduled by the first DCI format. Otherwise (for example, when PUSCH-RepTypeB is not configured, or when PUSCH-RepTypA is configured), the UE the UE applies repetitive transmission type A to PUSCH repetitive transmission scheduled by the first DCI format.

(Invalid Symbol Pattern)

When repetitive transmission type B is applied to PUSCH transmission, notifying to the UE of information related to symbol(s) (or a symbol pattern) that cannot be used for the PUSCH transmission has been under study as well. The symbol pattern that cannot be used for the PUSCH transmission may be referred to as an invalid symbol pattern or the like.

Notifying of the invalid symbol pattern using at least one of higher layer signaling and DCI has been under study. The DCI may be a given DCI format (for example, at least one of DCI formats 0_1 and 0_2).

For example, using a first higher layer parameter, information related to the invalid symbol pattern that cannot be used for the PUSCH transmission is notified to the UE. Whether the information related to the invalid symbol pattern is applied may be notified to the UE, using DCI. In this case, a bit field for indicating whether the information related to the invalid symbol pattern is applied (a notification field as to whether the invalid symbol pattern is applied) may be configured in the DCI.

Using a second higher layer parameter, whether the notification field (or an additional bit) in the DCI is configured may be notified to the UE. In other words, when the information related to the invalid symbol pattern is notified to the UE using the first higher layer parameter, the UE may determine whether to apply the information related to the invalid symbol pattern, based on the second higher layer parameter and the DCI.

When the first higher layer parameter is not notified or configured, the UE may control transmission of the PUSCH without taking the invalid symbol pattern into consideration. When the first higher layer parameter is notified or configured, the UE may determine whether to apply the invalid symbol pattern, based on the second higher layer parameter and the DCI. For example, addition of an additional bit (or a given field) for indicating whether to apply the invalid symbol pattern to the DCI is indicated by the second higher layer parameter, the UE may determine whether to apply the invalid symbol pattern, based on the given field.

The first higher layer parameter is only required to be information for notifying of a symbol pattern invalid for transmission of the PUSCH, and for example, a bitmap format may be applied (see FIG. 2A). FIG. 2A is a diagram to show an example of a case in which the invalid symbol pattern is defined in a bitmap (1-D bitmap) with respect to the time domain. Based on the information related to the invalid symbol pattern, the UE may determine the resources that can be used for PUSCH transmission in one or more frequency bandwidths (for example, BWPs) (see FIG. 2B).

Here, a case is shown in which one or a common invalid symbol pattern is applied to a plurality of BWPs, however a different invalid symbol pattern may be configured or applied for each BWP.

(Nominal Repetitions/Actual Repetitions)

When repetitive transmission is performed in a unit of a sub-slot by applying repetitive transmission type B, a certain repetitive transmission may cross a slot-boundary, depending on a repetition factor (K), a unit of allocation of data, and the like.

Figure 3A:
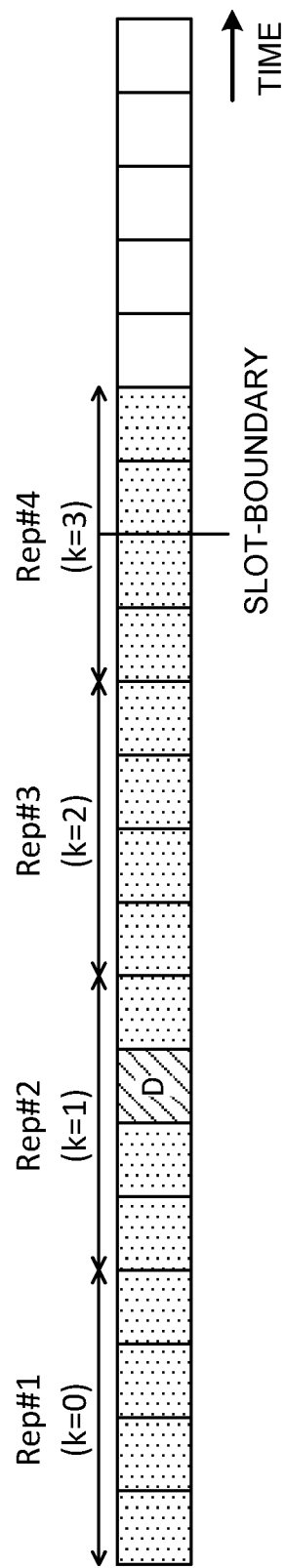
FIG. 3A and FIG. 3B are diagrams to show examples of nominal repetitions and actual repetitions.

FIG. 3A shows an example of a case in which repetitive transmission type B is applied, with the repetition factor (K) being 4 and the PUSCH length (L) being 4. In FIG. 3A, the PUSCH of k=3 is mapped across the slot-boundary. In such a case, the PUSCH may be transmitted being divided (or segmented) with respect to the slot-boundary (see FIG. 3B).

A case is also assumed in which a symbol that cannot be used for PUSCH transmission (for example, a DL symbol, an invalid symbol, or the like) is included in a slot. FIG. 3A shows a case in which a part of symbols to which the PUSCH of k=1 is mapped includes a symbol (here, a DL symbol) that cannot be used for the PUSCH transmission. In such a case, the PUSCH transmission may be performed using symbols except the DL symbol (see FIG. 3B).

When certain PUSCH-allocated symbols include a DL symbol (or an invalid symbol) in a symbol other than both ends, PUSCH transmission may be performed using symbols other than the part corresponding to the DL symbol. In this case, the PUSCH may be divided (or segmented).

Figure 3B:
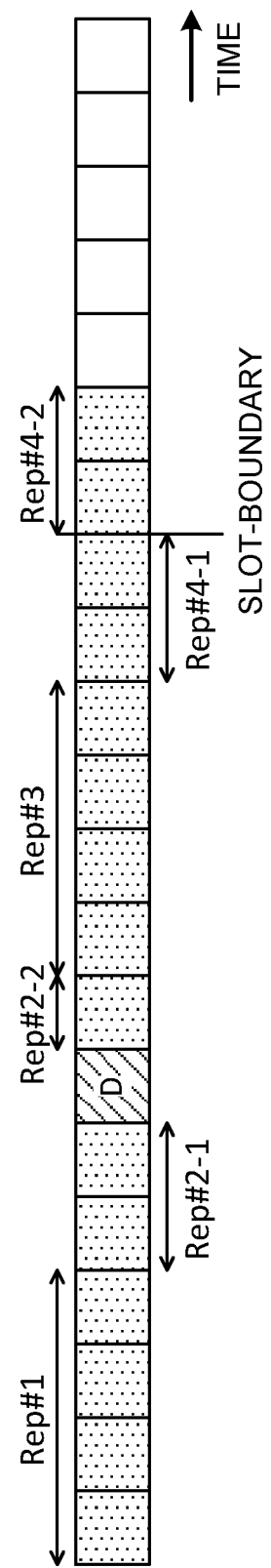

FIG. 3B shows a case in which the PUSCH of k=1 (Rep #2) is divided into two (Reps #2-1 and #2-2) by the DL symbol, and the PUSCH of k=3 (Rep #4) is divided into two (Reps #4-1 and #4-2) by the slot-boundary in sub-slot-based repetitive transmission.

Note that repetitive transmission (FIG. 3A) before the DL symbol, the invalid symbol, or the slot-boundary is taken into consideration may be referred to as nominal repetitions. Repetitive transmission (FIG. 3B) that takes the DL symbol, the invalid symbol, or the slot-boundary into consideration may be referred to as actual repetitions.

(Spatial Relation for SRS and PUSCH)

In Rel-15 NR, the UE may receive information (SRS configuration information, for example, a parameter in an RRC control element "SRS-Config") that is used for transmission of a reference signal for measurement (for example, a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to a given number of SRS resources (a given number of SRS resources may be grouped together). Each SRS resource may be identified by an SRS resource indicator (SRI) or an SRS resource ID (Identifier).

The SRS resource set information may include information of an SRS resource set ID (SRS-ResourceSetId), a list of SRS resource IDs (SRS-ResourceId) used in the resource set, an SRS resource type (for example, any one of a periodic SRS, a semi-persistent SRS, and aperiodic CSI (Aperiodic SRS)), and usage of the SRS.

Here, the SRS resource type may indicate any one of the periodic SRS (P-SRS), the semi-persistent SRS (SP-SRS), and the aperiodic CSI (Aperiodic SRS (A-SRS)). Note that the UE may periodically (or periodically after activation) transmit the P-SRS and the SP-SRS, and transmit the A-SRS, based on an SRS request of the DCI.

The usage (an RRC parameter "usage", an L1 (Layer-1) parameter "SRS-SetUse") may be, for example, beam management (beamManagement), codebook (CB), noncodebook (NCB), antenna switching, or the like. The SRS with the usage of the codebook or the noncodebook may be used for determination of a precoder of codebook-based or non-codebook-based PUSCH transmission based on the SRI.

For example, in a case of codebook-based transmission, the UE may determine the precoder for PUSCH transmission, based on the SRI, a transmitted rank indicator (TRI), and a transmitted precoding matrix indicator (TPMI). In a case of noncodebook-based transmission, the UE may determine the precoder for PUSCH transmission, based on the SRI.

The SRS resource information may include an SRS resource ID (SRS-ResourceId), the number of SRS ports, an SRS port number, transmission Comb, SRS resource mapping (for example, a time and/or frequency resource position, a resource offset, periodicity of resources, the number of repetitions, the number of SRS symbols, an SRS bandwidth, or the like), hopping related information, an SRS resource type, a sequence ID, spatial relation information of the SRS, or the like.

The spatial relation information (for example, an RRC information element "spatialRelationInfo") of the SRS may indicate spatial relation information between a given reference signal and the SRS. The given reference signal may be at least one of a synchronization signal/broadcast channel (a Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the given reference signal.

Note that, in the present disclosure, an SSB index, an SSB resource ID, and an SSB Resource Indicator (SSBRI) may be interchangeably interpreted. A CSI-RS index, a CSI-RS resource ID, and a CSI-RS Resource Indicator (CRI) may be interchangeably interpreted. An SRS index, an SRS resource ID, and an SRI may be interchangeably interpreted.

The spatial relation information of the SRS may include a serving cell index, a BWP index (BWP ID), or the like corresponding to the given reference signal.

In a case that the UE is configured with the spatial relation information associated with the SSB or the CSI-RS and the SRS for a certain SRS resource, the UE may use a spatial domain filter (spatial domain transmission filter) the same as a spatial domain filter (spatial domain reception filter) for receiving the SSB or the CSI-RS to transmit the SRS resource. In this case, the UE may assume that a UE receive beam for the SSB or the CSI-RS is the same as a UE transmit beam for the SRS.

In a case that the UE is configured with the spatial relation information associated with another SRS (reference SRS) and the SRS (target SRS) for a certain SRS (target SRS) resource, the UE may use a spatial domain filter (spatial domain transmission filter) the same as a spatial domain filter (spatial domain transmission filter) for transmission of the reference SRS to transmit the target SRS resource. In other words, in this case, the UE may assume that a UE transmit beam for the reference SRS is the same as a UE transmit beam for the target SRS.

Based on a value of a given field (for example, an SRS resource indicator (SRI) field) in DCI (for example, DCI format 0_1), the UE may determine spatial relation of the PUSCH scheduled by the DCI. Specifically, the UE may use, for PUSCH transmission, the spatial relation information (for example, the RRC information element "spatialRelationInfo") of the SRS resource determined based on a value (for example, the SRI) of the given field.

When codebook-based transmission is used for the PUSCH, for the UE, two SRS resources may be configured for each SRS resource set by RRC, and one of the two SRS resources may be indicated by the DCI (the SRI field of 1 bit). When noncodebook-based transmission is used for the PUSCH, for the UE, four SRS resources may be configured for each SRS resource set by RRC, and one of the four SRS resources may be indicated by the DCI (the SRI field of 2 bits).

(Transmit Power Control for PUSCH)

In NR, transmit power of the PUSCH is controlled based on a TPC command (also referred to as a value, an increase/decrease value, a correction value, or the like) that is indicated by a value of a given field (also referred to as a TPC command field or the like) in the DCI.

For example, when the UE transmits the PUSCH on an active UL BWP b of a carrier f of a serving cell c by using a parameter set (open loop parameter set) having an index j and an index l of a power control adjustment state, transmit power ($P_{PUSCH,b,f,c}(i, j, q_d, l)$) of the PUSCH in a PUSCH transmission occasion (also referred to as a transmission period or the like) i may be expressed as in the following Equation (1).

Here, whether the power control adjustment state has a plurality of states (for example, two states) or a single state may be configured using a higher layer parameter. When a plurality of power control adjustment states are configured, one of the plurality of power control adjustment states may be identified with the index l (for example, $l \in \{0, 1\}$). The power control adjustment state may be referred to as a PUSCH power control adjustment state, a first or second state, or the like.

The PUSCH transmission occasion i is a given period in which the PUSCH is transmitted, and may include, for example, one or more symbols, one or more slots, or the like.

[Math. 1]

(Equation 1)

$$P_{PUSCH,b,f,c}(i, j, q_d, i) = \min \begin{cases} P_{CMAX,f,c}(i), \\ P_{O\_PUSCH,b,f,c}(j) + 10\log_{10}(2^\mu \cdot M^{PUSCH}_{RB,b,f,c}(i)) + \\ \alpha_{b,f,c}(j) \cdot PL_{b,f,c}(q_d) + \Delta_{TF,b,f,c}(i) + f_{b,f,c}(i, l) \end{cases}$$

In Equation (1), $P_{CMAX,f,c}(i)$ is, for example, transmit power (also referred to as maximum transmit power, UE maximum output power, or the like) of the user terminal configured for the carrier f of the serving cell c in the transmission occasion i. $P_{O\_PUSCH,b,f,c}(j)$ is, for example, a parameter (for example, also referred to as a parameter related to a transmit power offset, a transmit power offset P0, a target received power parameter, or the like) related to target received power configured for the active UL BWP b of the carrier f of the serving cell c in a parameter set configuration j.

$M^{PUSCH}_{RB, b,f,c}(i)$ is, for example, the number of resource blocks (bandwidth) allocated for the PUSCH for the transmission occasion i in the active UL BWP b of the carrier f of the serving cell c and a subcarrier spacing μ. $\alpha_{b,f,c}(j)$ is a value provided using a higher layer parameter (for example, also referred to as msgA-Alpha, p0-PUSCH-Alpha, a fractional factor, or the like).

$PL_{b,f,c}(q_d)$ is, for example, path loss (path loss compensation) that is calculated in the user terminal by using an index $q_d$ of a reference signal (path loss reference RS, DL RS for path loss measurement, PUSCH-PathlossReferenceRS) for the downlink BWP associated with the active UL BWP b of the carrier f of the serving cell c.

$\Delta_{TF,b,f,c}(i)$ is a transmission power adjustment component (offset, transmission format compensation) for the UL BWP b of the carrier f of the serving cell c.

$f_{b,f,c}(i, l)$ is a value based on a TPC command of the power control adjustment state index l of the active UL BWP of the carrier f of the serving cell c and the transmission occasion i (for example, a power control adjustment state, an accumulated value of the TPC commands, or a value by a closed loop). For example, $f_{b,f,c}(i, 1)$ may be expressed as in equation (2). 1 may be referred to as a closed loop index.

[Math. 2]

$$f_{b,f,c}(i, l) = f_{b,f,c}(i - i_0, l) + \sum_{m=0}^{C(D_i)-1} \delta_{PUSCH,b,f,c}(m, l) \quad \text{(Equation 2)}$$

In Equation (2), $\delta_{PUSCH,b,f,c}(m, 1)$ represents a TPC command value in a PUSCH transmission occasion m. $\sum_{m=0}^{C(D\_i)-1} \delta_{PUSCH,b,f,c}(m, 1)$ represents a sum of TPC command values in a set of TPC command values of a group $C(D_i)$ between $K_{PUSCH}(i-i_0)$ symbols before a PUSCH transmission occasion $i-i_0$ and $K_{PUSCH}(i)$ symbols before a PUSCH transmission occasion i. Here, $i_0$ represents an integer of 1 or more. The TPC command value in a PUSCH transmission occasion may be a TPC command indicated by the TPC command field value in the DCI (for example, DCI format 0_0/0_1/0_2) detected in the active UL BWP b of the carrier f of the serving cell c, or a TPC command indicated by the TPC command field value in the DCI (for example, DCI format 2_2) having a CRC parity bits scrambled (CRC-scrambled) with a particular Radio Network Temporary Identifier (RNTI) (for example, a TPC-PUSCH-RNTI).

The closed loop index may be based on a closed loop indicator field value in the DCI (for example, DCI format 2_2) having a CRC parity bits scrambled (CRC-scrambled) with a particular Radio Network Temporary Identifier (RNTI) (for example, a TPC-PUSCH-RNTI). When a specific higher layer parameter (for example, twoPUSCH-PC-AdjustmentStates) is not configured for the UE, the closed loop indicator field may be 0 bits (0), whereas when the specific higher layer parameter is configured for the UE, the closed loop indicator field may have a bit length of 1 bit.

When the UE is provided with power control configuration for the PUSCH by the SRI (for example, a higher layer parameter SRI-PUSCH-PowerControl), the UE may acquire an association between a set of values for the SRI field included in a DCI format for scheduling PUSCH transmission and a value of a closed loop index l provided by a specific higher layer parameter (for example, sri-PUSCH-ClosedLoopIndex). Then, the UE may determine the value of l corresponding to the SRI field.

In this manner, in NR, two independent closed loop power controls are supported.

Note that Equation (1) and Equation (2) are merely examples, and these are not restrictive. The user terminal is only required to control transmit power of the PUSCH, based on at least one parameter shown in Equation (1) and Equation (2), and an additional parameter may be included, or a part of the parameters may be omitted. In Equation (1) and Equation (2) described above, the PUSCH transmit power is controlled per active UL BWP of a carrier of a serving cell, but the present disclosure is not limited to this. At least some of the serving cell, the carrier, the BWP, and the power control adjustment state may be omitted.

(Multi-TRP)

Figure 4:
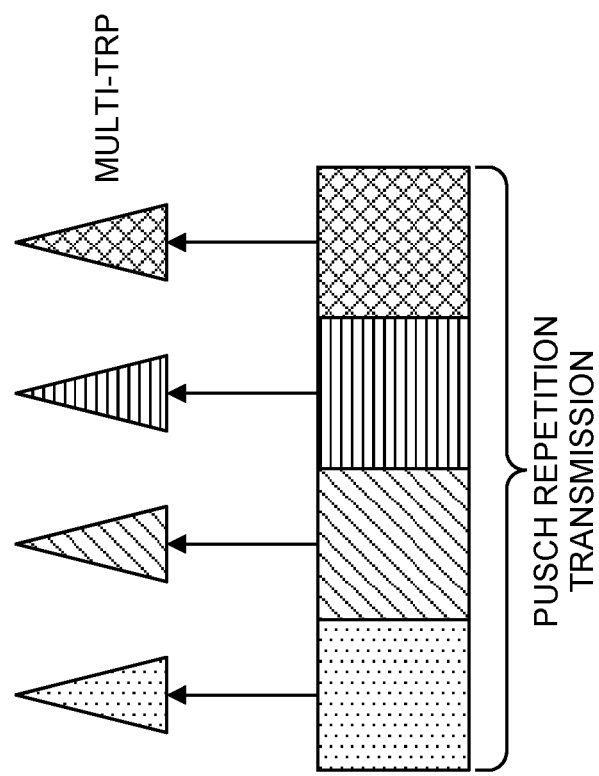
FIG. 4 is a diagram to show an example of PUSCH repetitive transmission in a multi-TRP.

For NR, a scheme in which one or more transmission/reception points (TRPs) (multi-TRP) perform DL transmission to the UE by using one or more panels (multi-panel) has been under study. A scheme in which the UE performs UL transmission to one or more TRPs has been under study as well (see FIG. 4).

The plurality of TRPs may correspond to the same cell identifier (ID), or may correspond to different cell IDs. The cell ID may be a physical cell ID, or a virtual cell ID.

However, in NR specifications thus far, a full study has not been conducted on how to control PUSCH repetitive transmission in multi-panel/TRP. Unless PUSCH repetitive transmission in the multi-TRP is appropriately performed, throughput may be reduced or communication quality may be deteriorated.

More specifically, a scheme has been under study in which, for PUSCH repetitive transmission in a plurality of TRPs using single DCI, a plurality of SRIs for the plurality of TRPs/a combination of SRIs are indicated by the DCI. In this case, considering the fact that there are differences in channel states between the UE and the different TRPs, there is a need for independent closed loop power controls for the plurality of TRPs (for example, power controls in which indices related to different TPCs (for example, closed loop indexes) correspond to different SRIs/combination of SRIs).

Figure 5:
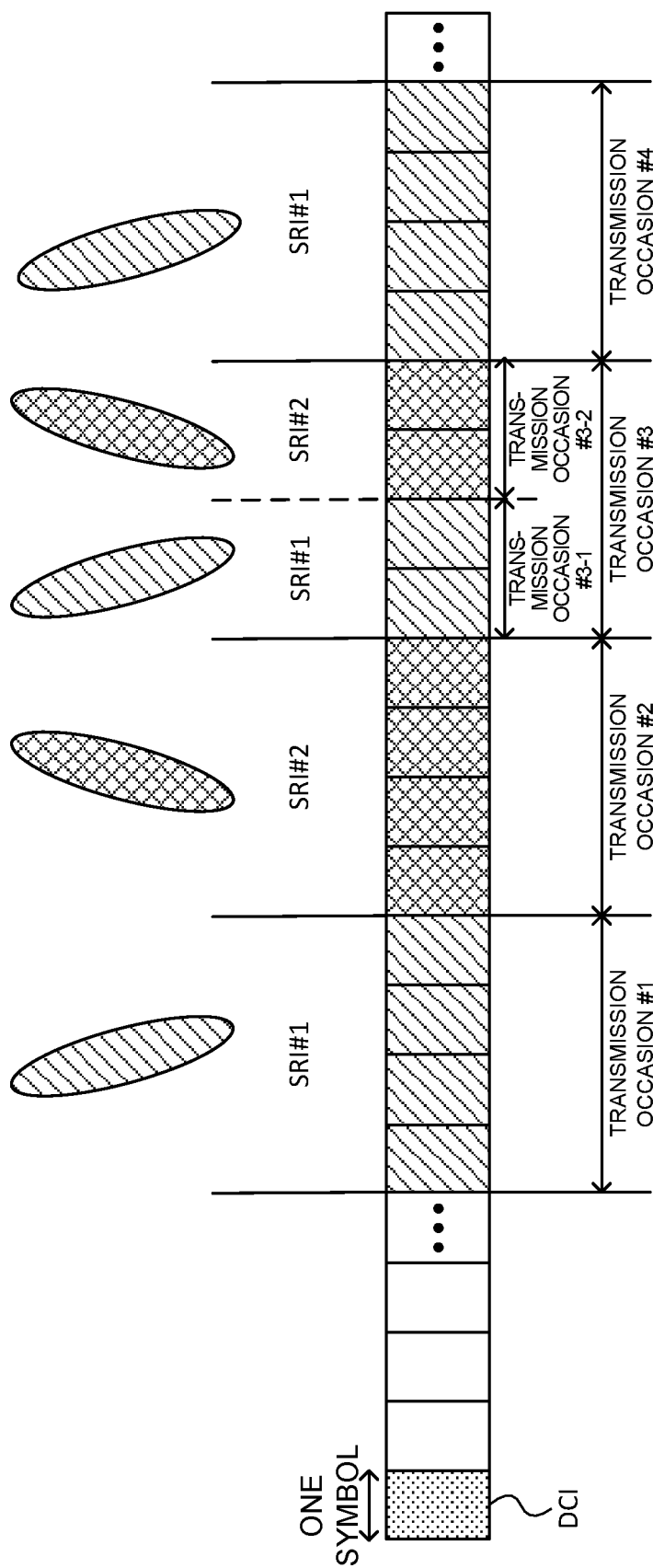
FIG. 5 is a diagram to show an example of a method of indicating a plurality of SRIs for a plurality of TRPs using single DCI.

FIG. 5 is a diagram to show an example of a method of indicating a plurality of SRIs for a plurality of TRPs using single DCI. The example shown in FIG. 5 shows a case of repetitive transmission type B, where four repetitive transmissions are performed by two TRPs and each of the repetitive transmissions is performed using four symbols, however the repetitive transmission is not limited thereto.

In the example shown in FIG. 5, PUSCH repetitive transmission is scheduled by certain DCI. The UE transmits the PUSCH to TRP #1 in transmission occasion #1, transmission occasion #3-1, and transmission occasion #4. The UE transmits the PUSCH to TRP #2 in transmission occasion #2 and transmission occasion #3-2. Although each transmission occasion has four symbols, transmission occasion #3 is a transmission occasion across a slot-boundary, and thus transmission occasion #3-1 corresponds to a preceding slot and transmission occasion #3-2 corresponds to a succeeding slot. SRI #1 and SRI #2 correspond to TRP #1 and TRP #2 respectively.

In the example shown in FIG. 5, it is desirable that each of SRI #1 and SRI #2 correspond to an index (for example, closed loop index) related to respective one of different TPCs. For example, it is desirable that SRI #1 correspond to closed loop index l=0, and SRI #2 correspond to closed loop index l=1.

In specifications thus far, as described above, using single DCI, one TPC command for one closed loop power control can be notified. However, a full study has not been conducted on how to indicate a plurality of TPC commands for a plurality of closed loop power controls using single DCI, and thus control suitable for a plurality of SRIs as in FIG. 5 cannot be performed. In Rel. 15/16, up to two independent closed loop power controls are supported, however considering UL transmission over a plurality of TRPs, there is a need for a larger number of independent closed loop power controls. In view of this, the inventors of the present invention came up with the idea of a control method of PUSCH repetitive transmission to solve the problem described above.

Embodiments according to the present disclosure will be described in detail with reference to the drawings as follows. The radio communication methods according to respective embodiments may each be employed individually, or may be employed in combination.

Note that, in the present disclosure, a panel, a beam, an Uplink (UL) transmission entity, a TRP, spatial relation information (SRI), spatial relation, a control resource set (CORESET), a PDSCH, a codeword, a base station, a given antenna port (for example, a demodulation reference signal (DMRS) port), a given antenna port group (for example, a DMRS port group), a given group (for example, a code division multiplexing (CDM) group, a given reference signal group, a CORESET group, a panel group, a beam group, a spatial relation group, a PUCCH group), and a CORESET pool may be interchangeably interpreted. A panel Identifier (ID) and a panel may be interchangeably interpreted. A TRP ID and a TRP may be interchangeably interpreted.

In the present disclosure, an index, an ID, an indicator, and a resource ID may be interchangeably interpreted.

In the present disclosure, "A/B" may mean "at least one of A and B".

In the present disclosure, a list, a group, a cluster, a subset, and the like may be interchangeably interpreted. In the present disclosure, spatial relation information (SRI), an SRS resource indicator (SRI, or an SRI field), an SRS resource, a precoder, and the like may be interchangeably interpreted.

In the present disclosure, spatial relation information (SRI), a combination of pieces of SRI, SRI for codebook-based transmission, a combination of pieces of noncodebook-based SRI, spatialRelationInfo, a UL TCI, a TCI state, a Unified TCI, a QCL, and the like may be interchangeably interpreted.

The PUSCH over a plurality of TRPs in the following embodiments may be interchangeably interpreted as repetition PUSCHs over a plurality of TRPs, or simply PUSCH repetition, repetitive transmissions, a plurality of PUSCH transmissions, and the like.

(Radio Communication Method)

First Embodiment

A first embodiment describes a particular index for performing the repetitive transmission of PUSCH using a plurality of TRPs, the particular index being determined by the UE. The particular index may be an index associated with the TPC (for example, closed loop index). The UE may control a plurality of PUSCH transmissions based at least on the particular index.

The number of candidates for the particular index determined by the UE (for example, closed loop index) may increase to the particular number (for example, N) in comparison with that in Rel. 15/16. The particular number N may be four, for example. A possible value of the particular index may be from 0 to N−1, for example.

Then, in an RRC configuration, a correspondence relation between the spatial relation information (SRI) and N particular indices may be configured for the UE. The UE may be updated regarding the correspondence relation through higher layer signaling (for example, MAC CE).

The UE may determine, based on the correspondence relation, the value of the particular index corresponding to each SRI/combination of SRIs indicated by the DCI.

In a case that the number of candidates for the particular index is N, the number of bits of a field (for example, a closed loop indicator field) that is included in a particular DCI format (for example, DCI format 2_2) and indicates a closed loop power control may increase to $\log_2(N)$ bits as compared with Rel. 15/16. For example, in a case that N=4, the field may have a bit length of two bits.

According to the first embodiment, even in the case of performing the repetitive transmission of the PUSCH using a plurality of TRPs, the index appropriately associated with the TPC can be determined.

Second Embodiment

A second embodiment describes the number of bits of a TPC command field included in single DCI scheduling a PUSCH transmission across a plurality of TRPs, and correspondence between the TPC command field and the index associated with the TPC (for example, a closed loop index). The UE may control a plurality of PUSCH transmissions based at least on the index.

The number of bits of a TPC command field included in single DCI scheduling a PUSCH transmission across a plurality of TRPs may be extended to a particular number of bits (for example, 2M) as compared with the number of bits in Rel. 15/16. In the present disclosure, M may be the number of TRPs, or may be the number of spatial relation information (SRI) possibly indicated for a PUSCH transmission across a plurality of TRPs.

For example, regarding codebook-based transmission, in a case that the SRI for the PUSCH transmission to two TRPs is indicated by the DCI, the TPC command field may be extended to four bits.

Correspondence between the extended TPC command field and the particular index associated with the TPC (for example, a closed loop index) may conform to at least one of a correspondence 1 or a correspondence 2 described below. Hereinafter, a closed loop index is described, and a closed loop index according to the present disclosure may be interpreted as any particular index associated with the TPC.

[Correspondence 1]

In a case that the extended TPC command field is divided by a particular number of bits (for example, two, four, or the like), the x-th (x represents any integer) smallest (or largest) particular number of bits may correspond to the x-th spatial relation information (SRI/combination of SRIs) indicated by the DCI.

Figure 6A:
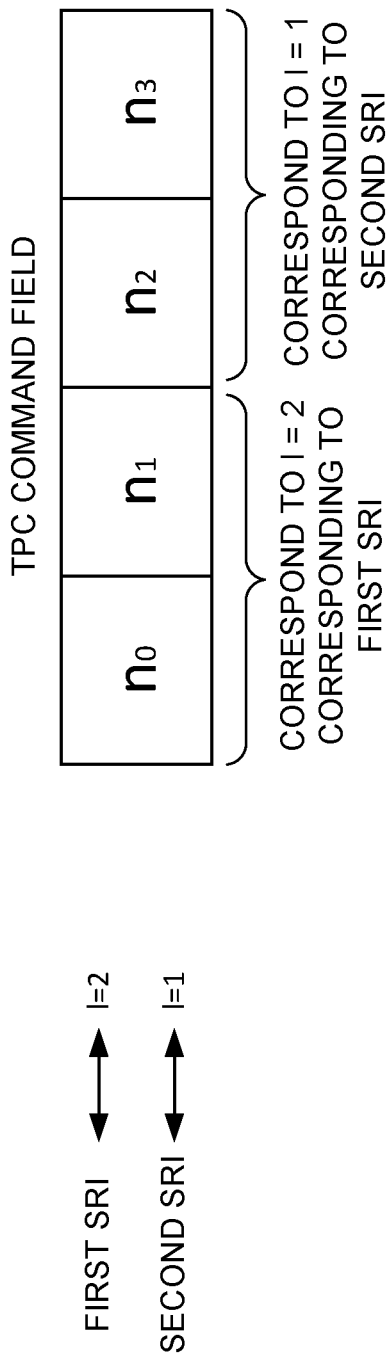
FIG. 6A and FIG. 6B are diagrams to show examples of association between an extended TPC command field and closed loop indexes.

FIG. 6A is a diagram to show an example of a correspondence between the extended TPC command field and the closed loop index. The example shown in FIG. 6A shows a case of M=2, in which a first SRI corresponds to a closed loop index l=2 and a second SRI corresponds to a closed loop index l=1. In the example shown in FIG. 1A, the TPC command field is expressed with a left side being lower-order bits and a right side being higher-order bits. Then, lower-order two bits of the TPC command field (no and $n_1$) correspond to the closed loop index l=2 corresponding to the first SRI, and higher-order two bits ($n_2$ and $n_3$) correspond to the closed loop index l=1 corresponding to the second SRI.

Note that in the drawings shown in the present disclosure, the SRI, the value of the closed loop index, the number of bits and value of the TPC command field, and the like are all examples, and that the present disclosure is not limited to this. In the drawings shown in the present disclosure, the TPC command field is expressed with the left side being lower-order bits and the right side being higher-order bits, but the present disclosure is not limited to this.

[Correspondence 2]

In the case that the extended TPC command field is divided by the particular number of bits (for example, two), the x-th smallest (or largest) particular number of bits may correspond to the spatial relation information (SRI) corresponding to the x-th smallest (or largest) closed loop index indicated by the DCI.

In the present disclosure, "small" may be interpreted as "large". In addition, lower-order and lowest-order may be interpreted as higher-order and highest-order, respectively.

Figure 6B:
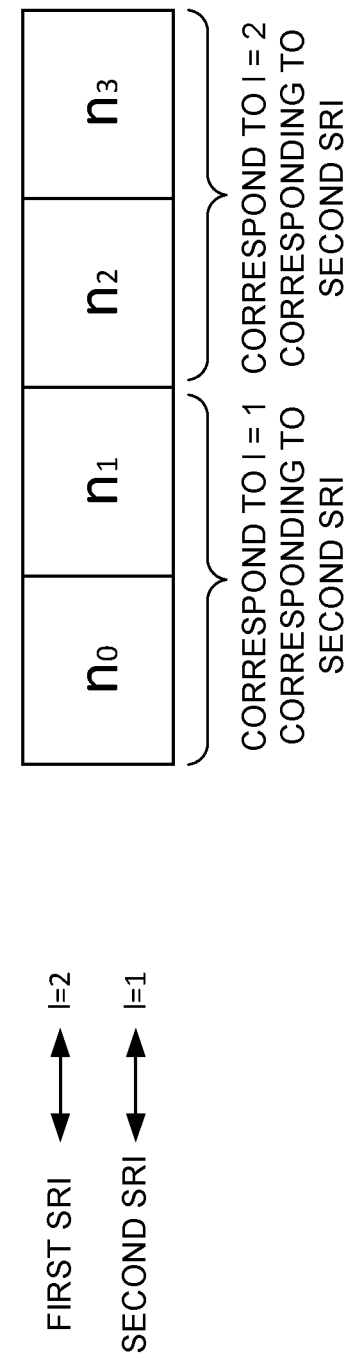

FIG. 6B is a diagram to show an example of a correspondence between the extended TPC command field and the closed loop index. The example shown in FIG. 6B shows the case of M=2, in which a first SRI corresponds to a closed loop index l=2 and a second SRI corresponds to a closed loop index l=1. Then, lower-order two bits of the TPC command field ($n_0$ and $n_1$) correspond to the closed loop index l=1 corresponding to the second SRI, and higher-order two bits ($n_2$ and $n_3$) correspond to the closed loop index l=2 corresponding to the first SRI.

In a case that at least two of a plurality of pieces of SRI/combination of SRIs indicated by the DCI correspond to the same closed loop index, the correspondence between the extended TPC command field and the particular index associated with the TPC may conform to at least one of a correspondence 2-1 or a correspondence 2-2 described below.

<<Correspondence 2-1>>

Valid bits of the TPC command may be determined based on values of different closed loop indices corresponding to the SRI indicated by the DCI. The UE may determine the valid bits for the TPC command field based on the values of the different closed loop indices.

Specifically, the UE may determine that the particular number (for example, 2L) of lower-order (or higher-order) bits of the TPC command field included in the DCI are the valid bits. The other bits may be set to a fixed value (for example, 0 or 1). The UE may ignore the relevant other bits. Then, L may represent a value of a different closed loop index corresponding to the SRI.

FIG. 7A is a diagram to show another example of the correspondence between the extended TPC command field and the closed loop index. In the example shown in FIG. 7A, the first SRI and the second SRI correspond to the closed loop index l=1, and a third SRI corresponds to the closed loop index l=2. Then, the lowest-order two bits of the TPC command field (no and $n_1$) correspond to the closed loop index l=1 corresponding to the first SRI and the second SRI, and the next lower-order two bits ($n_2$ and $n_3$) correspond to the closed loop index l=2 corresponding to the third SRI.

Then, the highest-order two bits of the TPC command field ($n_4$ and $n_5$) may be set to a fixed value (for example, 0 or 1).

<<Correspondence 2-2>>

Valid bits of the TPC command may be determined based on at least one of the number of TRPs (PUSCHs) or the number of SRI possibly indicated for the PUSCH transmission by a plurality of TRPs. The UE may determine the valid bits for the TPC command field based on at least one of the number of TRPs (PUSCHs) or the number of SRI possibly indicated for the PUCCH transmission by a plurality of TRPs.

Specifically, the UE may determine that the particular number of bits (for example, 2M) of the TPC command field included in the DCI are the valid bits. Then, M may represent the number of TRPs, or may represent the number of SRI possibly indicated for the PUSCH transmission by a plurality of TRPs.

2L bits (L represents the number of values of the different closed loop indices corresponding to the SRI, for example) of 2M bits of the TPC command field in the DCI may indicate a TPC command corresponding to any closed loop index. The other bits (remaining 2M-2L bits) may be set to a value the same as any of the values of the valid bits. In other words, the other bits may have a copied value of any of the values of the valid bits. The relevant other bits may have a copied value of the TPC command field value corresponding to the same value of the closed loop index corresponding to at least two of SRIs.

FIG. 7B is a diagram to show another example of the correspondence between the extended TPC command field and the closed loop index. In the example shown in FIG. 7B, the first SRI and the second SRI correspond to the closed loop index l=1, and the third SRI corresponds to the closed loop index l=2. Then, the lowest-order two bits of the TPC command field ($n_0$ and $n_1$) correspond to the closed loop index l=1 corresponding to the first SRI and the second SRI, and the next highest-order two bits ($n_4$ and $n_5$) correspond to the closed loop index l=2 corresponding to the third SRI.

Then, $n_2$ and $n_3$ in the TPC command field have a copied value of the TPC command field value corresponding to the same value of the closed loop index corresponding to at least two of SRIs. Specifically, $n_2$ and $n_3$ in the TPC command field are set to the same value of $n_0$ and $n_1$.

Variation of Second Embodiment

In a case that a dynamic switching between the PUSCH transmission using one TRP and the PUSCH transmission using a plurality of TRPs is supported, single or multiple SRIs may be indicated by the DCI. Then, in a case that single SRI is indicated by the DCI, the extended TPC command field may conform to at least one of a method 1 or a method 2 described below.

<<Method 1>>

The UE may determine that the particular number (for example, 2) of the lowest-order (or highest-order) bits of the TPC command field included in the DCI are the valid bits. The other bits may be set to a fixed value (for example, 0 or 1). The UE may ignore the relevant other bits.

Figure 8A:
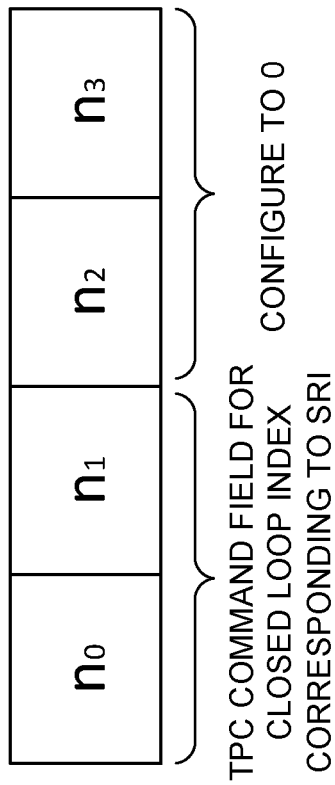
FIG. 8A and FIG. 8B are diagrams to show examples of association between the extended TPC command field and the SRI.

FIG. 8A is a diagram to show an example of a correspondence between the extended TPC command field and the spatial relation information (SRI). Then, the lowest-order two bits ($n_0$ and $n_1$) of the TPC command field are used for the TPC command field for the closed loop index corresponding to the SRI. On the other hand, remaining two bits ($n_2$ and $n_3$) are set to a fixed value (here, 0).

<<Method 2>>

The UE may determine that the particular number of bits (for example, 2M) of the TPC command field included in the DCI are the valid bits. Then, M may represent the number of TRPs, or may represent the maximum number of SRI possibly indicated for the PUSCH transmission by a plurality of TRPs.

Some bits (for example, two bits) of 2M bits of the TPC command field in the DCI may indicate a TPC command corresponding to any closed loop index. The other bits (remaining 2M-2 bits) may be set to a value the same as the value set for the relevant some bits.

Figure 8B:
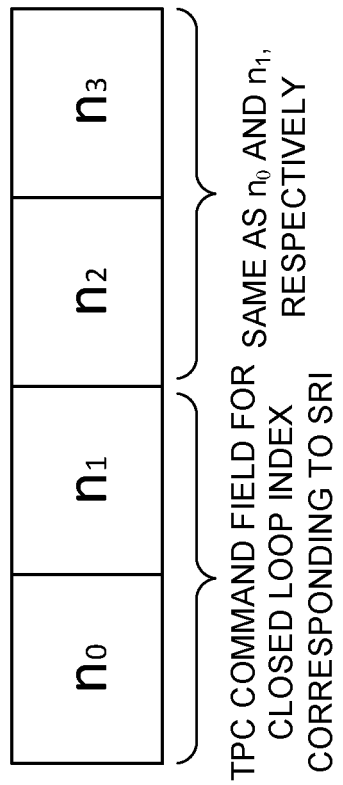

FIG. 8B is a diagram to show an example of the correspondence between the extended TPC command field and the SRI. Then, the lowest-order two bits ($n_0$ and $n_1$) of the TPC command field are used for the TPC command field for the closed loop index corresponding to the SRI. On the other hand, remaining two bits ($n_2$ and $n_3$) are set to a value the same as the value of the valid bits, in other words, $n_0$ and $n_1$, respectively.

According to the variation of the second embodiment, whether the number of SRI/combination of SRIs indicated by the DCI is one or more than one, the TPC command for each SRI can be appropriately determined using the extended TPC command field.

According to the second embodiment and the variation of the second embodiment described above, the correspondence between the extended TPC command field and the index associated with the TPC can be appropriately configured.

Third Embodiment

A third embodiment describes UE capability for the index associated with the TPC (for example, a closed loop index). The UE may report (transmit) whether to have the capability information to a NW.

The UE capability for the index associated with the TPC may be defined as the maximum number of a total number of the indices for a plurality of (for example, all) TRPs in a serving cell. In other words, the UE capability may be defined as the maximum number of the total number of the indices for a plurality of PUSCHs.

The UE capability for the index associated with the TPC may be defined as the maximum number of the indices per TRP in a serving cell. In other words, the UE capability may be defined as the maximum number of the indices for one PUCCH of a plurality of PUSCHs.

Note that each embodiment of the present disclosure may be applicable under at least one of conditions of a case that the UE reports the UE capability corresponding to at least one of the above to the NW, and a case that at least one UE capability above is configured/activated/indicated for the UE through higher layer signaling. Each embodiment of the present disclosure may be applicable to a case that a particular higher layer parameter (for example, information enabling the extended TPC command field, information configuring more than two closed loop indices, a parameter enabling the M-TRP repetition, or the like) is configured/activated/indicated for the UE.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 9:
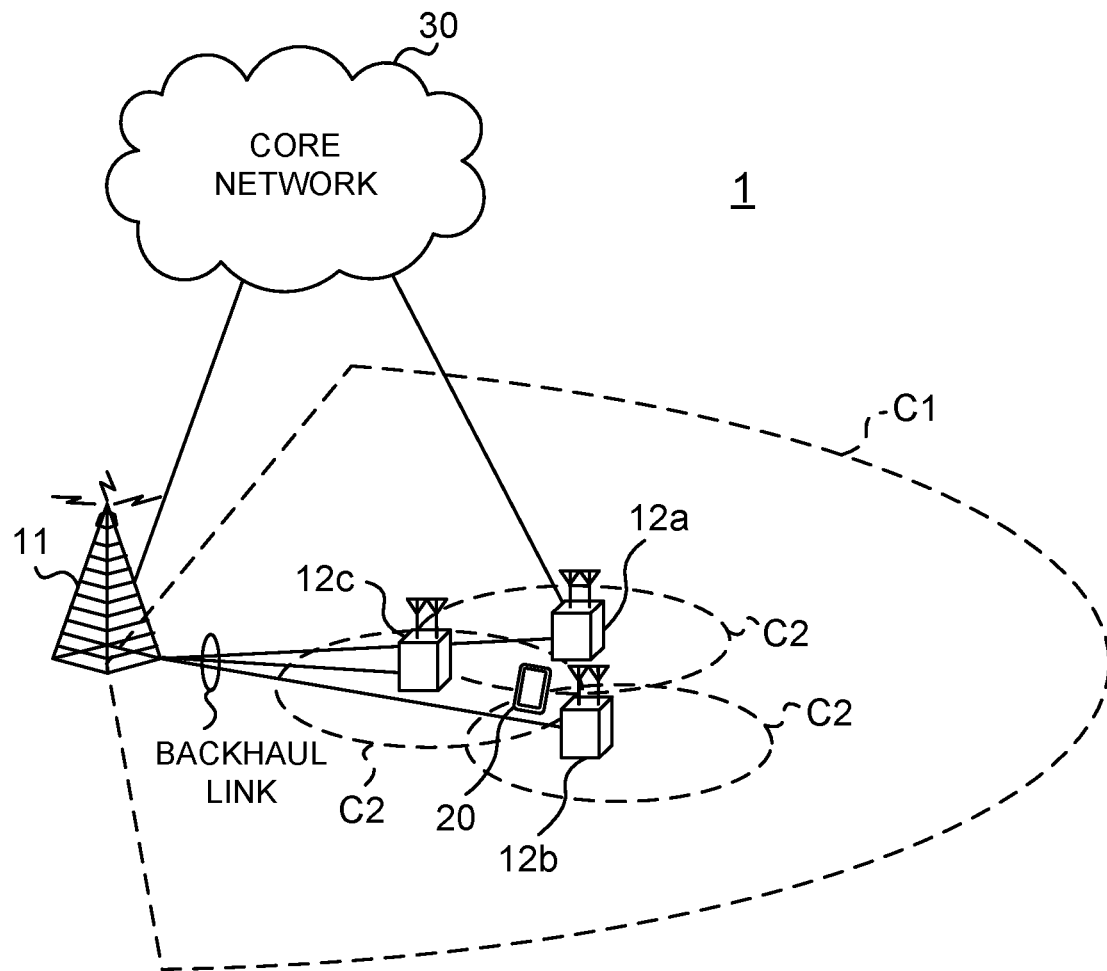
FIG. 9 is a diagram to show an example of a schematic structure of a radio communication system according to one embodiment.

FIG. 9 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations (for example, RRHs) 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 10:
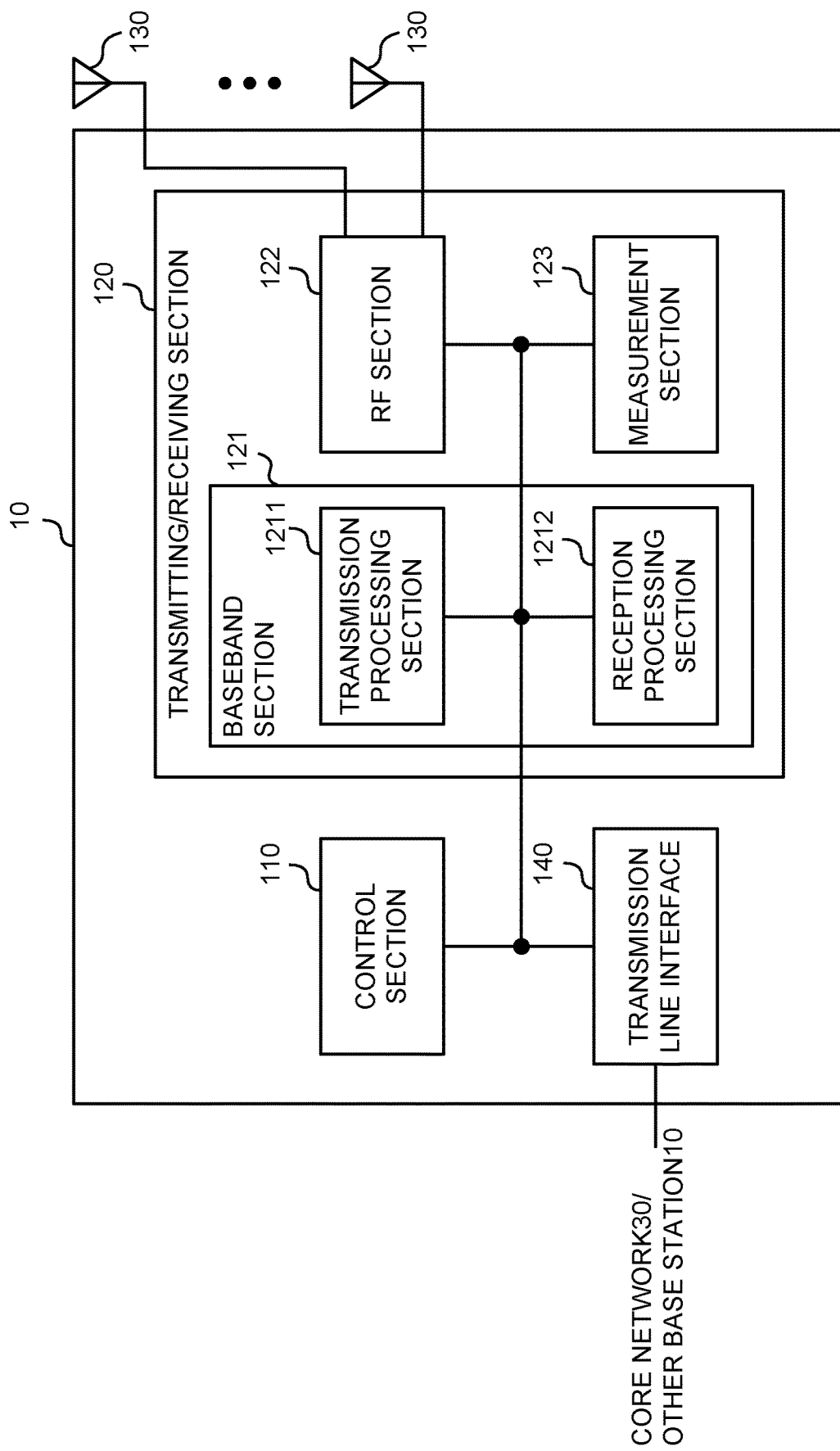
FIG. 10 is a diagram to show an example of a structure of a base station according to one embodiment.

FIG. 10 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/ receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 may transmit single downlink control information (DCI) for a plurality of uplink shared channels (Physical Uplink Shared Channels (PUSCHs)). The control section 110 may control reception of the PUSCHs transmitted based on an extended TPC command field included in the DCI and spatial relation information (SRI) corresponding to an index associated with the TPC (the first and second embodiments).

(User Terminal)

Figure 11:
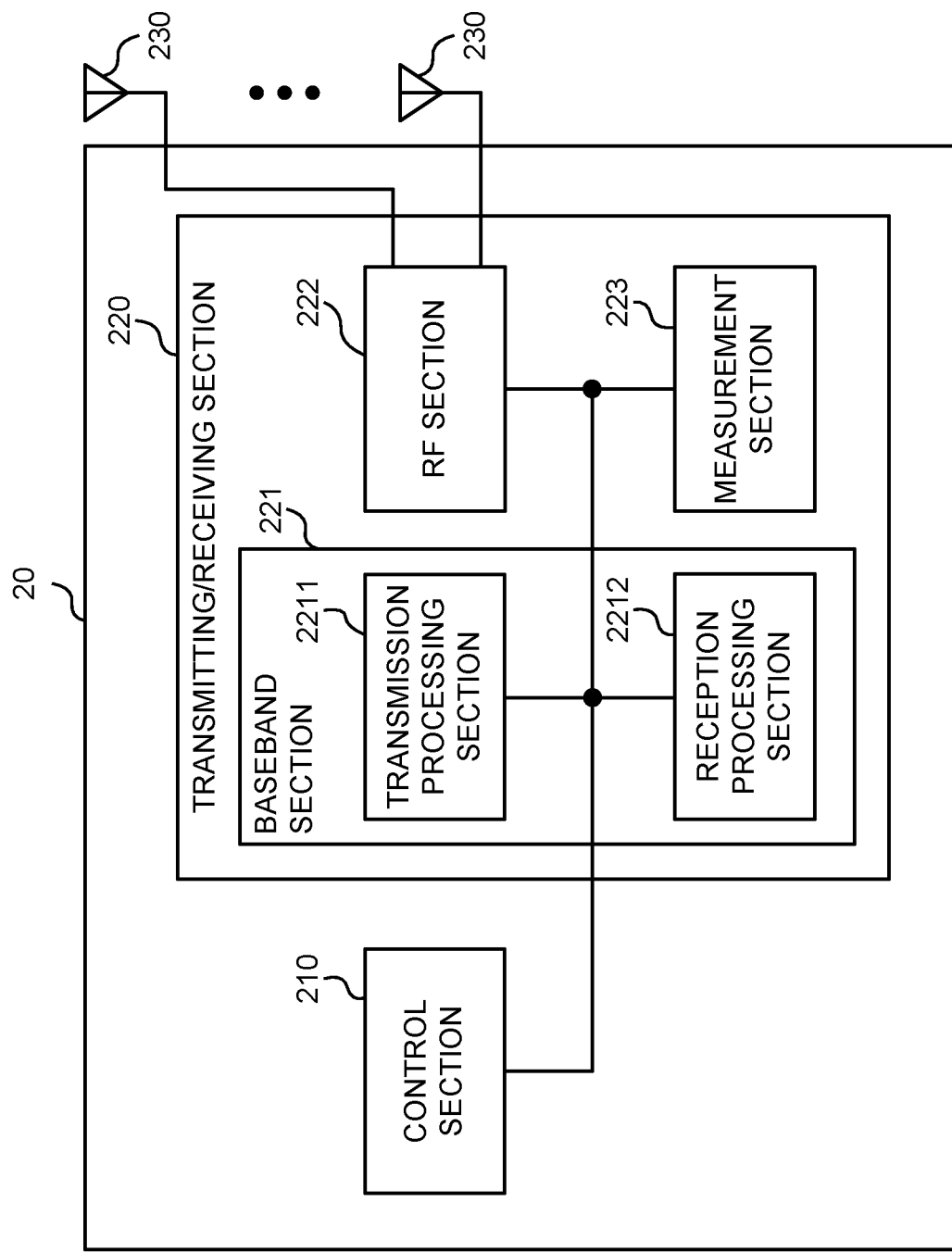
FIG. 11 is a diagram to show an example of a structure of a user terminal according to one embodiment.

FIG. 11 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive single downlink control information (DCI) for a plurality of uplink shared channels (Physical Uplink Shared Channels (PUSCHs)). The control section 210 may control transmission of the PUSCHs, based on an extended TPC command field included in the DCI and spatial relation information (SRI) corresponding to an index associated with the TPC (the first and second embodiments).

The control section 210 may control transmission of the PUSCHs based on the SRI corresponding to each particular number of bits of the extended TPC command field being divided into a particular number (the second embodiment).

The control section 210 may determine valid bits in the extended TPC command field, based on at least one of the number of indices associated with the different TPC, the number of the PUSCHs, and the number of pieces of the SRI (the second embodiment).

The control section 210 may control such that capability information is reported, the capability information being defined as a maximum number of a total number of the indices associated with the TPC for the plurality of PUSCHs or a maximum number of the indices associated with the TPC for one PUSCH of the plurality of PUSCHs (the third embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 12:
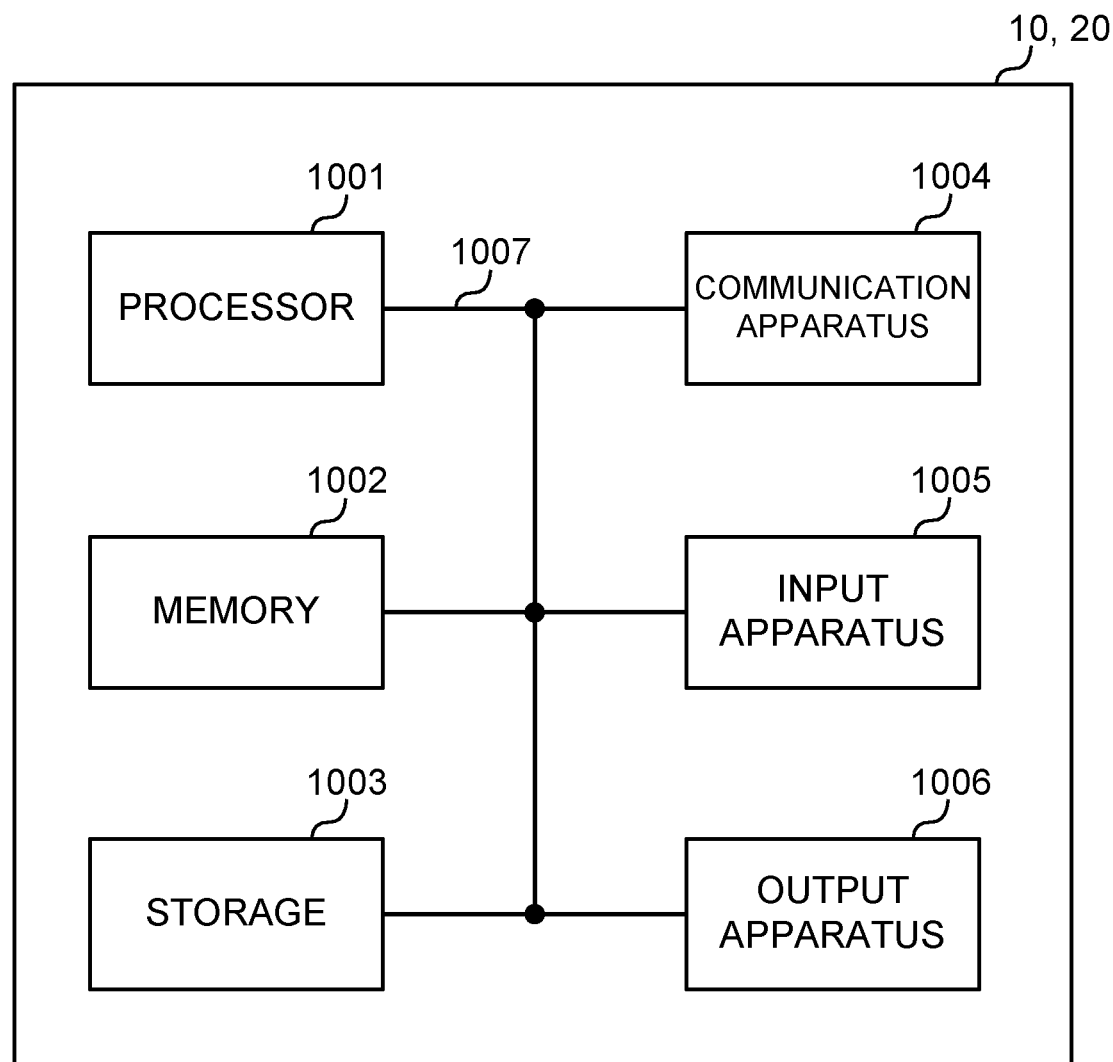
FIG. 12 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 12 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be indicated by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation.

The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a receiver that receives single downlink control information (DCI) for repetitive transmission of a physical uplink shared channel (PUSCH); and
    a processor that, when a plurality of spatial relation information are indicated for the repetitive transmission of the PUSCH by the DCI, controls a transmission power of the PUSCH, based on a particular number of lower-order bits for a transmission power control (TPC) command corresponding to a first closed loop index and a particular number of higher-order bits for a TPC command corresponding to a second closed loop index that are included in the DCI, and based on at least one of the first closed loop index and the second closed loop index that correspond to the plurality of spatial relation information.

2. The terminal according to claim 1, wherein when the plurality of spatial relation information are indicated by the DCI, the processor uses one of the particular number of lower-order bits and the particular number of higher-order bits to control the transmission power of the PUSCH, and ignores the other of the particular number of lower-order bits and the particular number of higher-order bits.

3. The terminal according to claim 1, wherein a number of bits of the particular number of higher-order bits is configured by higher layer signaling.

4. The terminal according to claim 2, wherein a number of bits of the particular number of higher-order bits is configured by higher layer signaling.

5. A radio communication method for a terminal, comprising:
receiving single downlink control information (DCI) for repetitive transmission of a physical uplink shared channel (PUSCH); and
when a plurality of spatial relation information are indicated for the repetitive transmission of the PUSCH by the DCI, controlling a transmission power of the PUSCH, based on a particular number of lower-order bits for a transmission power control (TPC) command corresponding to a first closed loop index and a particular number of higher-order bits for a TPC command corresponding to a second closed loop index that are included in the DCI, and based on at least one of the first closed loop index and the second closed loop index that correspond to the plurality of spatial relation information.

6. A base station comprising:
a transmitter that transmits single downlink control information (DCI) for repetitive transmission of a physical uplink shared channel (PUSCH); and
a processor that, when the processor indicates, for a terminal, a plurality of spatial relation information for the repetitive transmission of the PUSCH by the DCI, controls to include a particular number of lower-order bits for a transmission power control (TPC) command corresponding to a first closed loop index and a particular number of higher-order bits for a TPC command corresponding to a second closed loop index in the DCI so as to cause the terminal to control a transmission power of the PUSCH,
wherein at least one of the first closed loop index and the second closed loop index corresponds the plurality of spatial relation information.

7. A system comprising a terminal and a base station, wherein
the terminal comprises:
a receiver that receives single downlink control information (DCI) for repetitive transmission of a physical uplink shared channel (PUSCH); and
a processor of the terminal that, when a plurality of spatial relation information are indicated for the repetitive transmission of the PUSCH by the DCI, controls a transmission power of the PUSCH, based on a particular number of lower-order bits for a transmission power control (TPC) command corresponding to a first closed loop index and a particular number of higher-order bits for a TPC command corresponding to a second closed loop index that are included in the DCI, and based on at least one of the first closed loop index and the second closed loop index that correspond to the plurality of spatial relation information, and
the base station comprises:
a transmitter that transmits the single DCI; and
a processor of the base station that, when the processor of the base station indicates, for the terminal, the plurality of spatial relation information for the repetitive transmission of the PUSCH by the DCI, controls to include the particular number of lower-order bits and the particular number of higher-order bits in the DCI so as to cause the terminal to control a transmission power of the PUSCH.

* * * * *